(12) United States Patent
Wise

(10) Patent No.: US 10,337,246 B1
(45) Date of Patent: Jul. 2, 2019

(54) LADDER/DOLLY/CART SYSTEM

(71) Applicant: Thomas F. Wise, Tarpon Springs, FL (US)

(72) Inventor: Thomas F. Wise, Tarpon Springs, FL (US)

( * ) Notice: Subject to any disclaimer, the term of this patent is extended or adjusted under 35 U.S.C. 154(b) by 0 days.

(21) Appl. No.: 15/237,776

(22) Filed: Aug. 16, 2016

(51) Int. Cl.
| *E06C 1/397* | (2006.01) |
| *B62B 3/02* | (2006.01) |
| *B62B 1/12* | (2006.01) |
| *B62B 1/00* | (2006.01) |
| *E06C 1/383* | (2006.01) |
| *E06C 1/387* | (2006.01) |
| *B62B 5/06* | (2006.01) |

(52) U.S. Cl.
CPC .............. *E06C 1/397* (2013.01); *B62B 1/002* (2013.01); *B62B 1/12* (2013.01); *B62B 3/02* (2013.01); *B62B 5/067* (2013.01); *E06C 1/383* (2013.01); *E06C 1/387* (2013.01)

(58) Field of Classification Search
CPC .................................. B62B 1/002; E06C 1/397
See application file for complete search history.

(56) References Cited

U.S. PATENT DOCUMENTS

| 3,704,799 A * | 12/1972 | Morris, Jr. ................ B62B 1/14 187/232 |
| 3,954,155 A * | 5/1976 | Guidara .................... E06C 1/20 182/20 |
| 5,476,282 A * | 12/1995 | Dahl ....................... B62B 1/002 280/47.18 |
| 6,173,811 B1 * | 1/2001 | Tornabene ................ B62B 1/12 182/20 |
| 6,328,319 B1 * | 12/2001 | Stahler, Sr. ............. B62B 1/002 280/47.18 |
| 6,488,304 B2 * | 12/2002 | Krawczyk ............... B62B 1/002 280/408 |
| 6,588,775 B2 * | 7/2003 | Malone, Jr. ............. B62B 1/002 280/47.18 |
| 6,651,774 B2 * | 11/2003 | Yoo ........................ E06C 1/393 182/129 |
| 7,093,840 B2 * | 8/2006 | Lucas ...................... B60B 37/00 182/20 |
| 7,163,213 B2 * | 1/2007 | Chambers ............... B62B 1/002 180/209 |
| 8,746,708 B2 * | 6/2014 | Wang ....................... B25H 5/00 280/32.6 |
| 9,409,587 B1 * | 8/2016 | D'Sanson ................ B62B 3/02 |
| 10,005,481 B1 * | 6/2018 | Lopez ...................... B62B 1/22 |

(Continued)

*Primary Examiner* — Colleen M Chavchavadze

(57) ABSTRACT

First and second forward legs have pivot ends and free ends. First and second rearward legs have pivot ends and free ends. Four pivot brackets are provided. Two of the four pivot brackets extend rearwardly from each forward leg. In this manner the angle between the forward and rearward legs may be varied. Also provided is a top step, a middle step, and a bottom step. Each step is horizontal when in a ladder orientation. Further provided is an imperforate tongue. The imperforate tongue is pivotably secured between the rearward legs adjacent to the free ends. In this manner the rearward legs may be perpendicularly positioned when in a dolly orientation. Provided last are four wheels. Four wheels are secured to the forward legs. The four wheels extend forwardly from the forward legs for use when in a cart orientation.

5 Claims, 6 Drawing Sheets

(56) References Cited

U.S. PATENT DOCUMENTS

| | | | |
|---|---|---|---|
| 2005/0087943 A1* | 4/2005 | Babkes | B62B 1/002 280/30 |
| 2009/0261547 A1* | 10/2009 | Ross | B62B 1/10 280/47.2 |

* cited by examiner

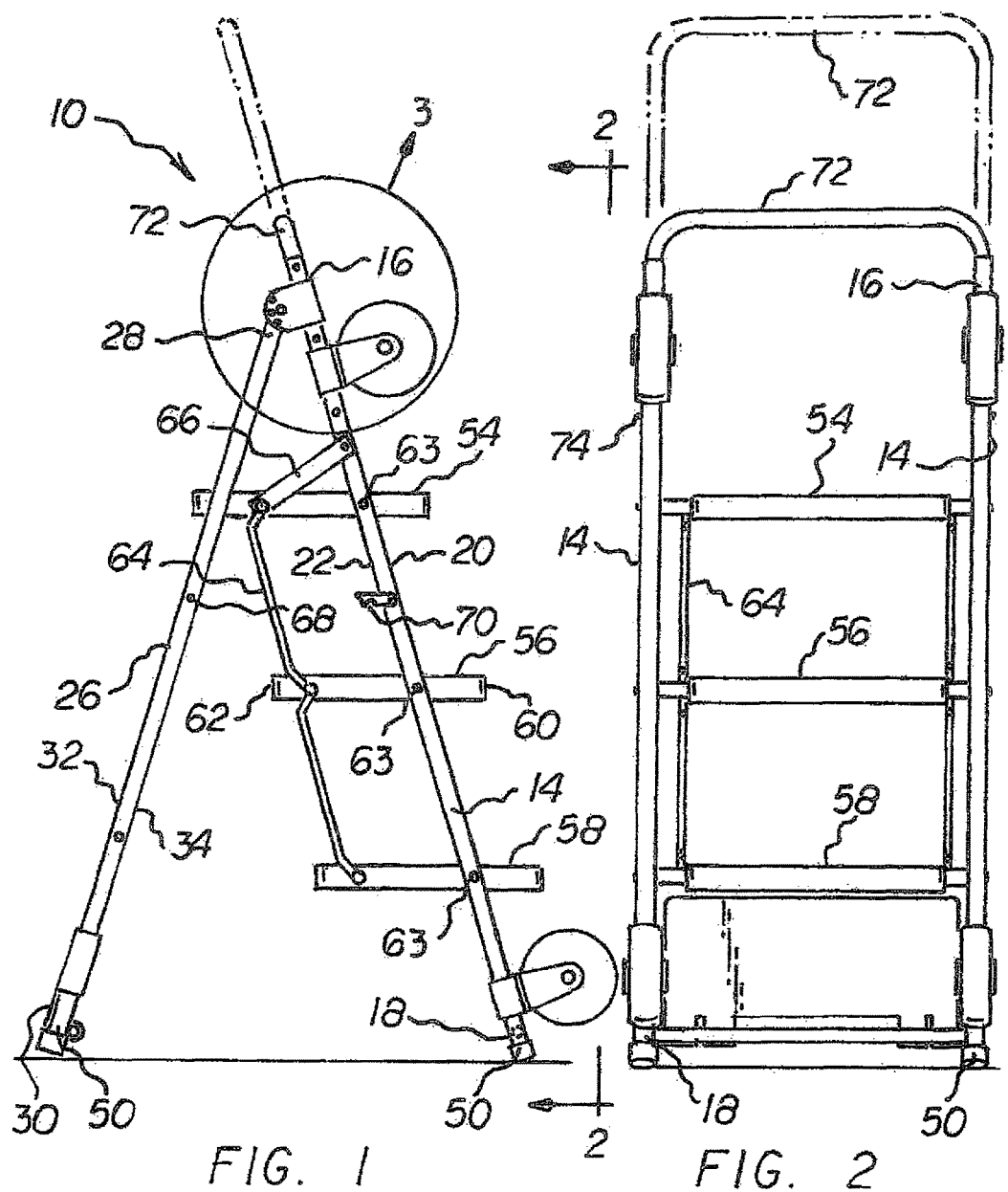

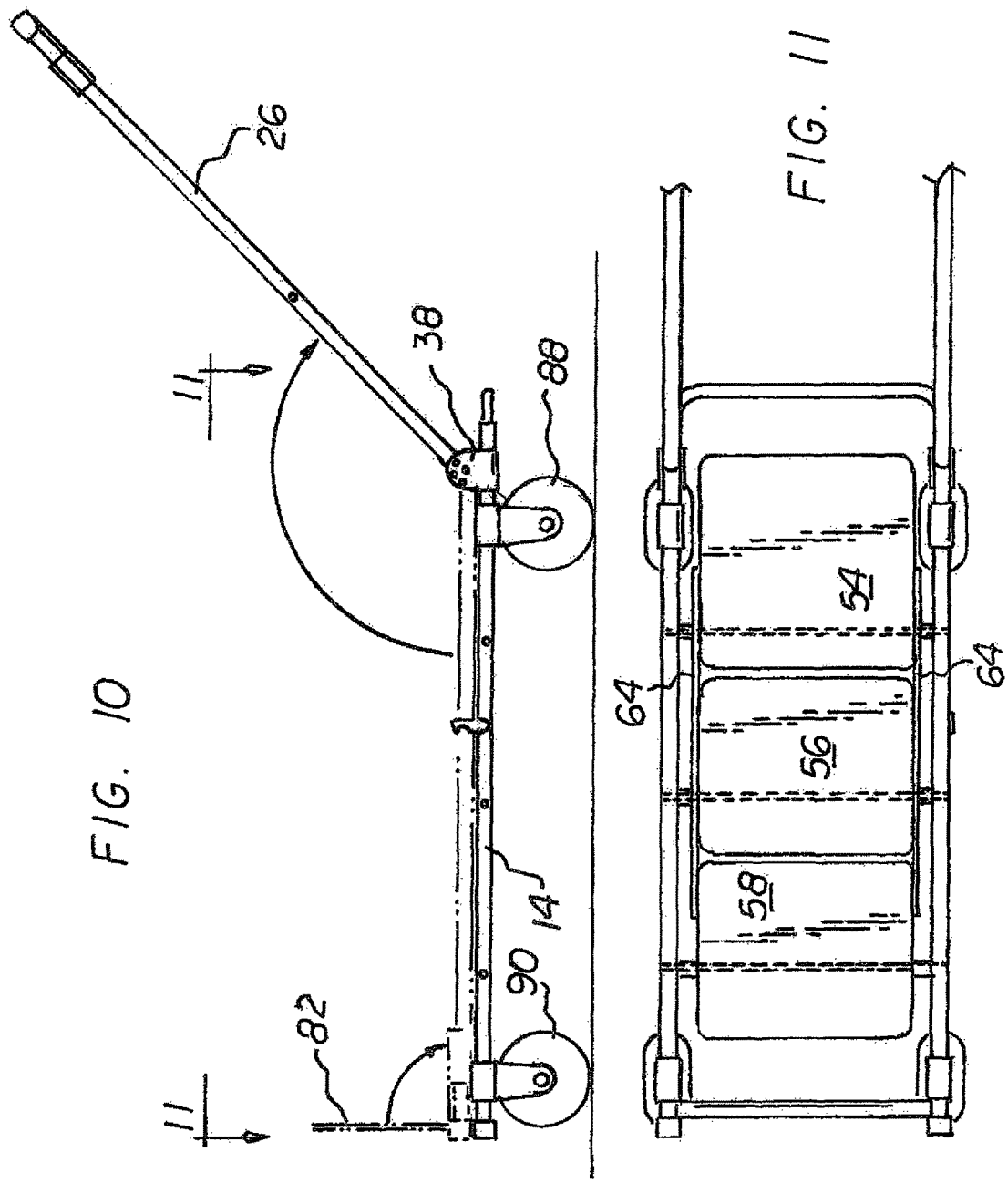

LADDER/DOLLY/CART SYSTEM

BACKGROUND OF THE INVENTION

Field of the Invention

The present invention relates to a ladder/dolly/cart system and more particularly pertains to use as a ladder and as a dolly and as a cart, the system adapted for converting between a ladder orientation, a dolly orientation, and a cart orientation, the use and the converting being in a safe, convenient and economic manner.

Description of the Prior Art

The use of ladder and transportation systems of known designs and configurations is known in the prior art. More specifically, ladder and transportation systems of known designs and configurations previously devised and utilized for use as ladders and dollies and carts are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a ladder/dolly/cart system that allows use as a ladder and as a dolly and as a cart, the system adapted for converting between a ladder orientation, a dolly orientation, and a cart orientation, the use and the converting being in a safe, convenient and economic manner.

In this respect, the ladder/dolly/cart system according to the present invention substantially departs from the conventional concepts and designs of the prior art, and in doing so provides an apparatus primarily developed for use as a ladder and as a dolly and as a cart, the system adapted for converting between a ladder orientation, a dolly orientation, and a cart orientation, the use and the converting being in a safe, convenient and economic manner.

Therefore, it can be appreciated that there exists a continuing need for a new and improved ladder/dolly/cart system which can be used for use as a ladder and as a dolly and as a cart, the system adapted for converting between a ladder orientation, a dolly orientation, and a cart orientation, the use and the converting being in a safe, convenient and economic manner. In this regard, the present invention substantially fulfills this need.

SUMMARY OF THE INVENTION

In view of the disadvantages inherent in the known types of ladder and transportation systems of known designs and configurations now present in the prior art, the present invention provides an improved ladder/dolly/cart system. As such, the general purpose of the present invention, which will be described subsequently in greater detail, is to provide a new and improved ladder/dolly/cart system and method which has all the advantages of the prior art and none of the disadvantages.

To attain this, from a broad viewpoint, the present invention is a ladder/dolly/cart system. First and second forward legs have pivot ends and free ends. First and second rearward legs have pivot ends and free ends. Four pivot brackets are provided. Two of the four pivot brackets extend rearwardly from each forward leg. In this manner the angle between the forward and rearward legs may be varied. Also provided is a top step, a middle step, and a bottom step. Each step is horizontal when in a ladder orientation. Further provided is an imperforate tongue. The imperforate tongue is pivotably secured between the rearward legs adjacent to the free ends. In this manner the rearward legs may be perpendicularly positioned when in a dolly orientation. Provided last are four wheels. Four wheels are secured to the forward legs. The four wheels extend forwardly from the forward legs for use when in a cart orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved ladder/dolly/cart system which has ail of the advantages of the prior art ladder and transportation systems of known designs and configurations and none of the disadvantages.

It is another object of the present invention to provide a new and improved ladder/dolly/cart system which may be easily and efficiently manufactured and marketed.

It is a further object of the present invention to provide a new and improved ladder/doily/cart system which is of durable and reliable constructions.

An even further object of the present invention is to provide a new and improved ladder/dolly/cart system which is susceptible of a low cost of manufacture with regard to both materials and labor, and which accordingly is then susceptible of low prices of sale to the consuming public, thereby making such ladder/dolly/cart system economically available to the buying public.

Lastly, it is an object of the present invention to provide a ladder/dolly/cart system for use as a ladder and as a dolly and as a cart, the system adapted for converting between a ladder orientation, a dolly orientation, and a cart orientation, the use and the converting being in a safe, convenient and economic manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a ladder/dolly/cart system constructed in accordance with the principles of the present invention, shown in a ladder orientation.

FIG. 2 is a front elevational view taken along line 2-2 of FIG. 1.

FIG. 10 is a side elevational view of the system changing from a dolly orientation to a cart orientation.

FIG. 11 is a plan view taken long line 11-11 of FIG. 10.

The same reference numerals refer to the same parts throughout the various Figures.

DESCRIPTION OF THE PREFERRED EMBODIMENT

Figure 3:
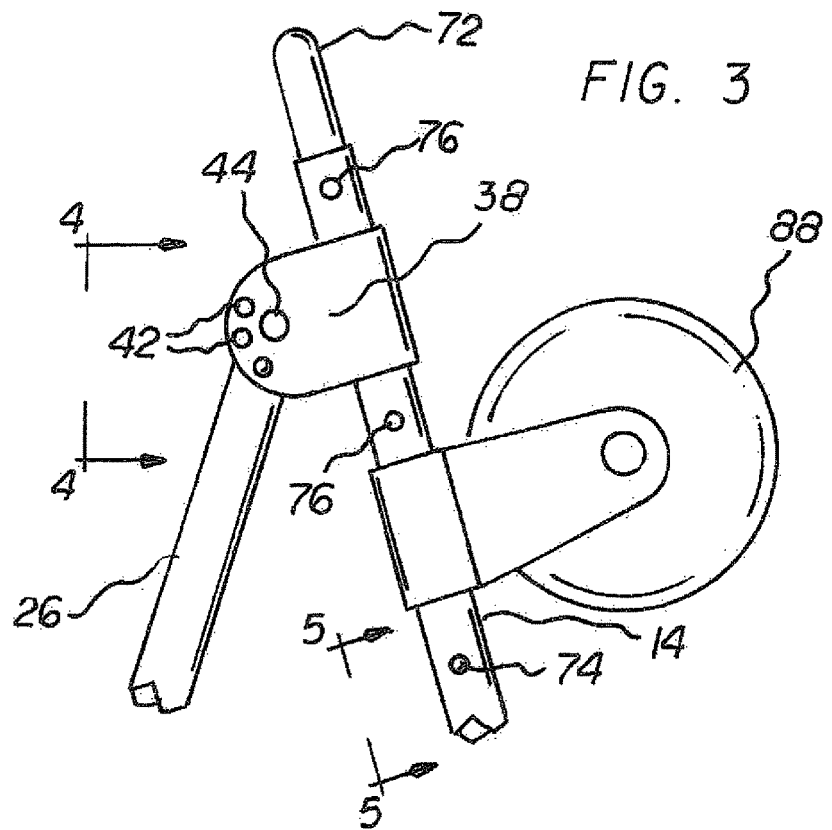
FIG. 3 is a side elevational view taken at circle 3 of FIG. 1.
Figure 4:
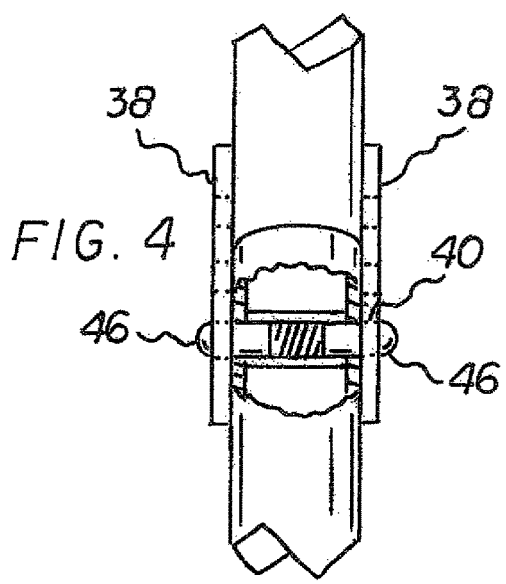
FIG. 4 is a rear elevational view taken along line 4-4 of FIG. 3, partly in cross section.
Figure 5:
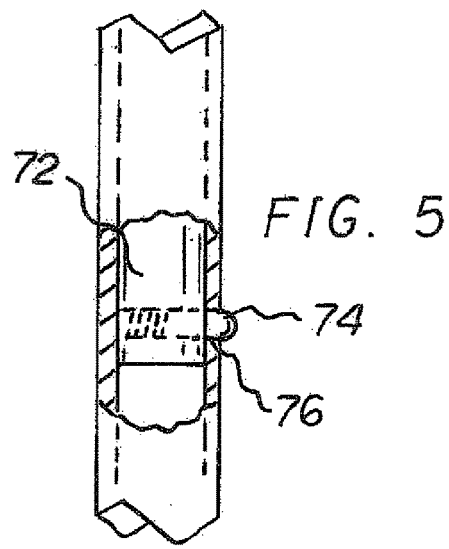
FIG. 5 is a rear elevational views taken along line 5-5 of FIG. 3, partly in cross section.
Figure 6:
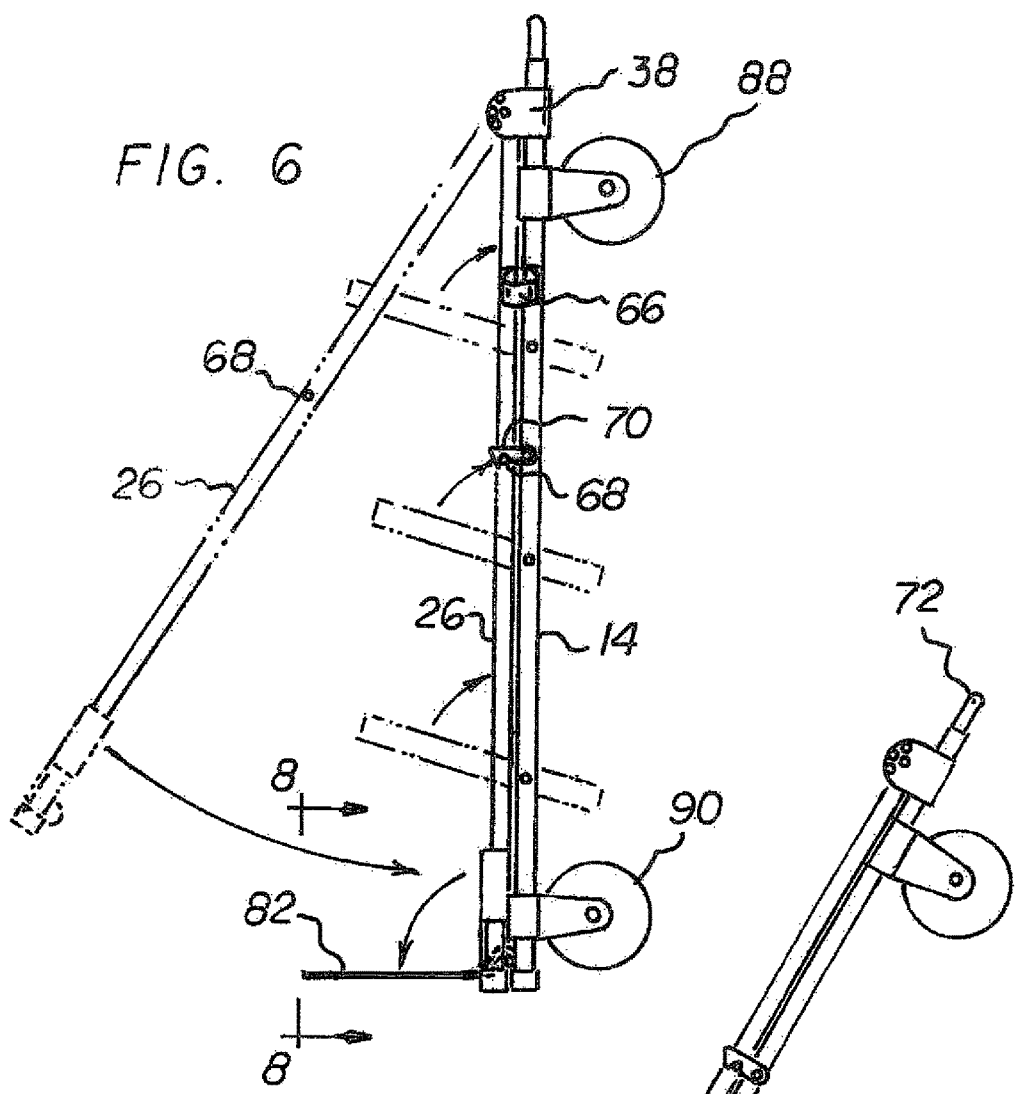
FIG. 6 is a side elevational view of the system changing from a ladder orientation to a dolly orientation.
Figure 7:
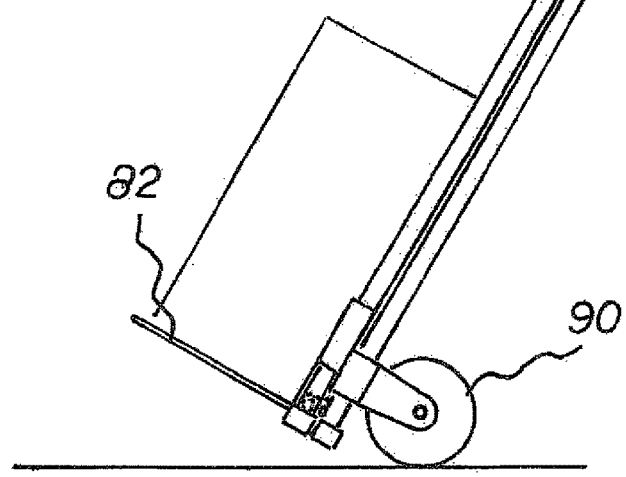
FIG. 7 is a side elevational view of the system in a dolly orientation.
Figure 8:
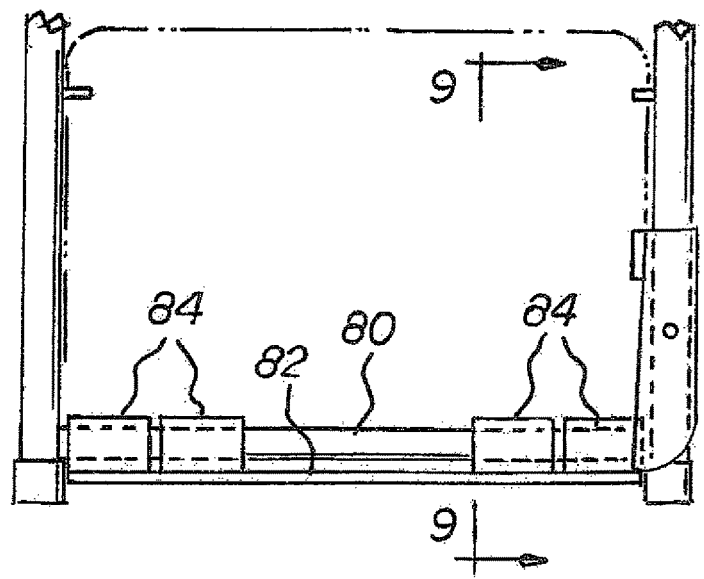
FIG. 8 is a rear elevational view taken along line 8-8 of FIG. 7.
Figure 9:
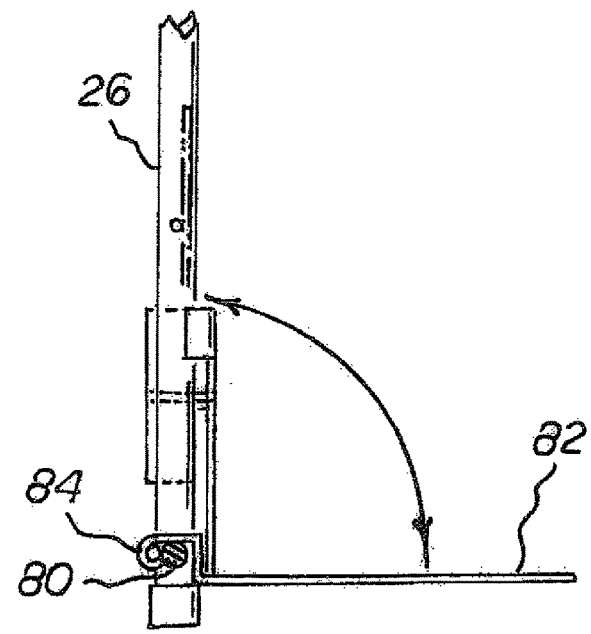
FIG. 9 is a cross sectional view taken along line 9-9 of FIG. 8.

With reference now to the drawings, and in particular to FIG. 1 thereof, the preferred embodiment of the new and improved ladder/dolly/cart system embodying the principles and concepts of the present invention and generally designated by the reference numeral 10 will be described.

The present invention, the ladder/dolly/cart system 10 is comprised of a plurality of components. In their broadest context such include forward legs, rearward legs, pivot brackets, steps, and imperforate tongue, and wheels. Such components are individually configured and correlated with respect to each other so as to attain the desired objective.

From a specific viewpoint, the present invention is a ladder/dolly/cart system. First provided are first and second forward legs 14. The first and second forward legs are parallel and laterally spaced. The forward legs have pivot ends 16 and free ends 18. The pivot ends and the free ends are separated by a forward leg length. The forward legs have exterior surfaces 20 and interior surfaces 22.

First and second rearward legs 26 are provided. The first and second rearward legs are parallel and laterally spaced. The rearward legs have pivot ends 28 and free ends 30. The pivot ends and the free ends are separated by a rearward leg length. The rearward legs have exterior surfaces 32 and interior surfaces 34.

Four pivot brackets 38 are provided next. Two of the four pivot brackets extend rearwardly from each of the forward legs adjacent to the pivot ends of the forward legs. Each pivot bracket has a central pivot hole 40. Each pivot bracket has a plurality of adjustment holes 42. The adjustment holes are equally spaced from the pivot hole in an arcuate configuration. Two pivot pins 44 are provided. Each pivot pin extends through two pivot holes and through a rearward leg adjacent to the pivot ends of the rearward legs. Four spring urged locking pins 46 are provided. Two of the spring urged locking pins are mounted in each rearward leg and extending through selected pivot holes. In this manner the angle between the forward legs and the rearward legs may be varied when in the ladder orientation as a function of the pivot holes receiving the pivot pins selected by a user.

Provided next is plurality of steps 54, 56, 58. The steps include a top step 54, a middle step 56, and a bottom step 58. Each step has a forward edge 60 and a rearward edge 62. The forward and rearward edges are separated by a step length. Each step is horizontal when in the ladder orientation. Six step pins 63 are provided. Each step has two of the step pins 63. The step pins pivotably couple each of the steps. The steps are coupled between the forward legs adjacent to the forward edges of the steps. Each step has a width. The steps have a common width. The top step has a step length greater than the step length of the middle step and the bottom step.

Two step rods 64 are provided next. Each step rod is pivotally coupled to the sides of each step. Each step rod is coupled adjacent to the rearward edges of the steps. A flexible strap 66 is provided. The flexible strap couples a forward leg above the top step to one of the step rods adjacent to the top step. A latch pin 68 is provided. The latch pin extends laterally from the middle step adjacent to one of the step rods. A latch 70 is provided. The latch is pivotably coupled to one of the forward legs. The latch is coupled between the top step and the middle step. The latch is adapted to receive and retain the latch pin. In this manner movement between the forward legs and rearward legs is abated. An inverted U-shaped handle 72 is provided. The handle has parallel ends. The parallel ends are slidably received in the forward legs at the pivot ends. Two handle pins 74 are provided. Each handle pin is located within a parallel end of the U-shaped handle. Each handle pin is spring urged outwardly from the parallel ends of the handle. The forward legs have a plurality of handle apertures 76. The handle apertures are provided adjacent to the pivot ends on opposite sides of the pivot brackets. The pivot apertures are adapted to selectively receive the pivot pins.

Further provided is a tongue rod 80. The tongue rod is provided between the rearward legs adjacent to the free ends. An imperforate tongue 82 is provided. The imperforate tongue is pivotably secured to the tongue rod. Two rotatable brackets 84 are provided. The rotatable brackets are on each side of the tongue. In this manner secure positioning perpendicular to the rearward legs is insured when in the dolly orientation. In the dolly orientation, the forward legs and the rearward legs are adjacent to each other. The steps are in a common plane. The steps form a step length. The spaces between the steps form space lengths. The space lengths are between 2 percent and 4 percent of the step length.

Next provided are two laterally spaced forward wheels 88. The laterally spaced forward wheels are secured to the forward legs adjacent to the pivot ends. The forward legs extend forwardly from the forward legs adjacent to the pivot ends. Two laterally spaced rearward wheels 90 are provided. The laterally spaced rearward wheels are secured to the forward legs adjacent to the free ends. The laterally spaced rearward wheels extend forwardly from the forward legs. Each wheel is extra large. In this manner off-road use is facilitated when in the cart orientation. Each wheel has a diameter between 10 percent and 15 percent of the rearward leg length.

Figure 12:
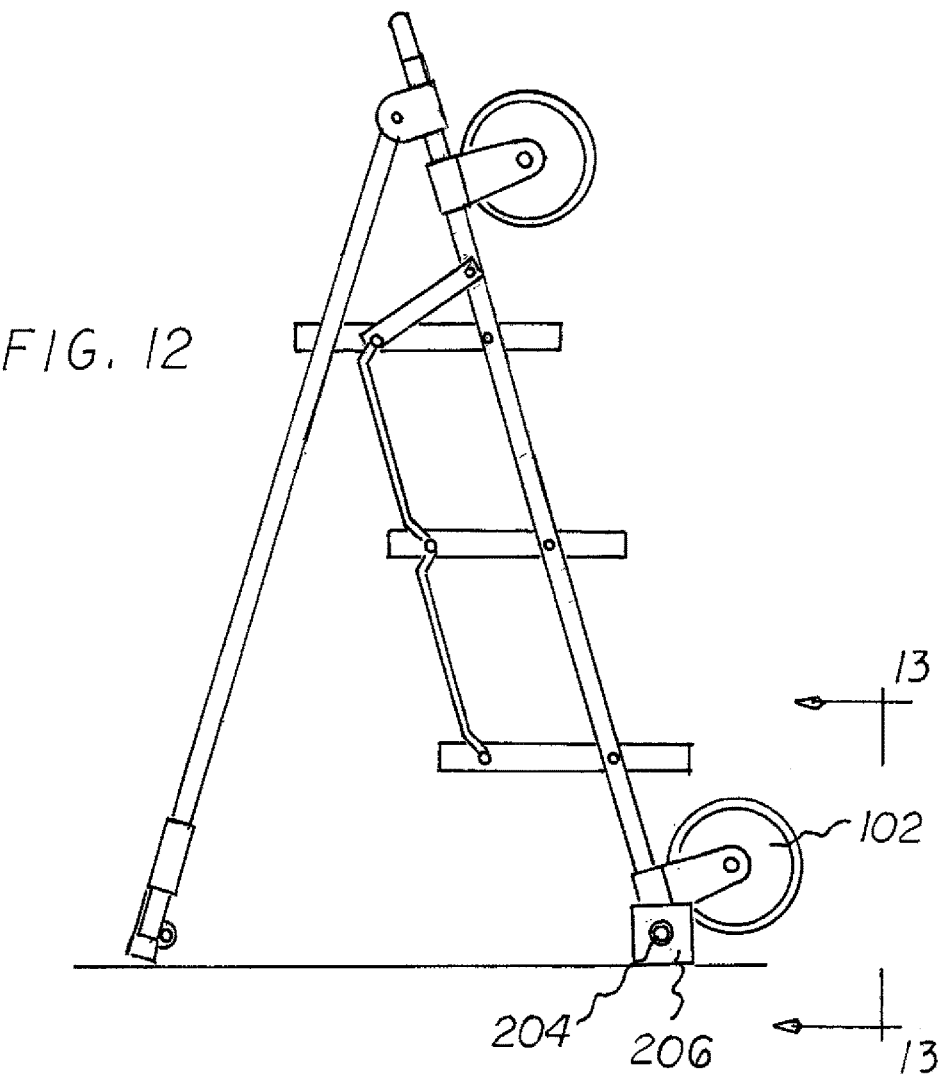
FIG. 12 is a front elevational view of a ladder/dolly/cart system constructed in accordance with an alternate embodiment of the present invention.
Figure 13:
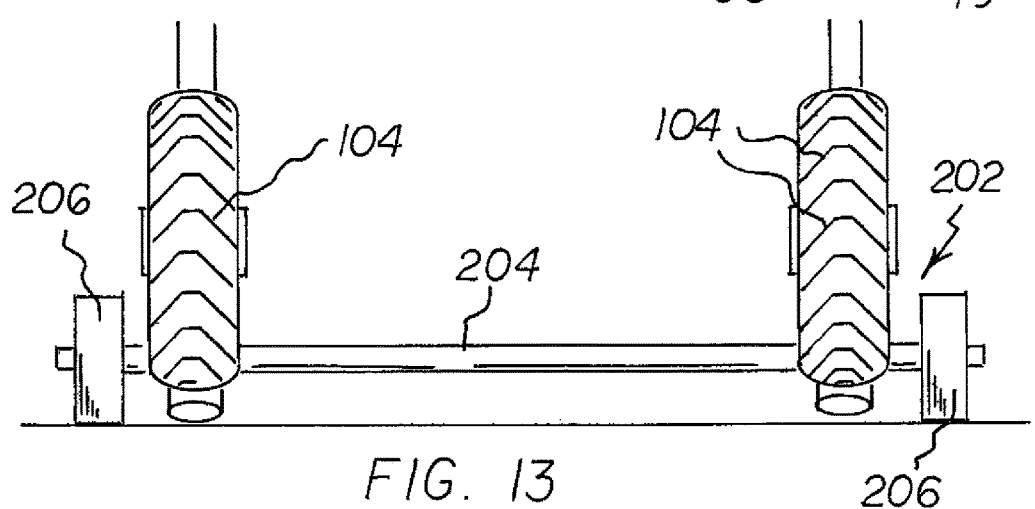
FIG. 13 is a front elevatrional view taken along line 13-13 of FIG. 12.

Lastly, as shown in FIGS. 12 and 13, an outrigger assembly 202 is provided. The outrigger assembly includes a supplemental axle 204. The supplemental axle extends through the forward legs adjacent to the free ends. The supplemental axle has axle ends exterior of the forward legs. Two rigid blocks 206 are provided. Each rigid block is in a generally rectilinear configuration. Each of the rigid blocks is pivotally secured to the supplemental axle adjacent one of the axle ends. Each rigid block is rotatable about the supplemental axle. The rigid blocks are adapted to contact a support surface to provide stability to the outrigger assembly and the system.

In an alternate embodiment of the invention as shown in FIGS. 12 and 13, the wheels 102 have rugged tread 104 to facilitate movement over loose soil, including sand.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A ladder/dolly/cart system comprising:
   first and second forward legs with pivot ends and free ends;
   first and second rearward legs with pivot ends and free end;
   four pivot brackets, two of the four pivot brackets extending rearwardly from each forward leg whereby the angle between the forward and rearward legs may be varied;
   a top step and a middle step and a bottom step, each step being horizontal when in a ladder orientation;
   an imperforate tongue pivotably secured between the rearward legs adjacent to the free ends for positioning perpendicular to the rearward legs when in a dolly orientation;
   four wheels secured to and extending forwardly from the forward legs for use when in a cart orientation; and
   an outrigger assembly, the outrigger assembly including a supplemental axle, the supplemental axle extending through the forward legs adjacent to the free ends, the supplemental axle having axle ends exterior of the forward legs, two rigid blocks, each block being in a generally rectilinear configuration and pivotally secured to the supplemental axle adjacent to one of the axle ends, each rigid block being rotatable about the supplemental axle, the rigid blocks adapted to contact a support surface to provide stability to the outrigger assembly and the system.

2. The system as set forth in claim 1 wherein, when the steps are in a common plane, each of the steps form a step length and the space between adjacent steps forms a space length, each space length being between 2 percent and 4 percent of the step length.

3. The system as set forth in claim 1 wherein the forward legs and the rearward legs have a common length, each wheel having a diameter between 10 percent and 15 percent of the common length of the forward and rearward legs.

4. The system as set forth in claim 1 wherein the wheels (102) have rugged tread (104) to facilitate movement over loose soil including sand.

5. A ladder/dolly/cart system (10) for use as a ladder and as a dolly and as a cart, the system adapted for converting between a ladder orientation, a dolly orientation, and a cart orientation, the use and the converting being in a safe, convenient and economic manner, the system comprising, in combination:
   first and second forward legs (14), the first and second forward legs being parallel and laterally spaced with pivot ends (16) and free ends (18) separated by a forward leg length and with exterior surfaces (20) and interior surfaces (22);
   first and second rearward legs (26), the first and second rearward legs being parallel and laterally spaced with pivot ends (28) and free ends (30) separated by a rearward leg length and with exterior surfaces (32) and interior surfaces (34);
   four pivot brackets (38), two of the four pivot brackets extending rearwardly from each of the forward legs adjacent to the pivot ends, each pivot bracket having a central pivot hole (40) and a plurality of adjustment holes (42) equally spaced from the pivot hole in an arcuate configuration, two pivot pins (44), each pivot pin extending through two pivot holes and through a rearward legs adjacent to the pivot ends, four spring urged locking pins (46), two spring urged locking pins mounted in each rearward leg and extending through selected pivot holes whereby the angle between the forward legs and the rearward legs may be varied when in the ladder orientation as a function of the pivot holes receiving the pivot pins selected by a user;
   a plurality of steps (54)(56)(58) including a top step (54) and a middle step (56) and a bottom step (58), each step having a forward edge (60) and a rearward edge (62) separated by a step length, each step being horizontal when in the ladder orientation, six step pins (63), each step having two of the six step pins (63) pivotably coupling each of the steps between the forward legs adjacent to the forward edges of the steps, each step having a width, the plurality of steps each having a common width, the top step having a step length greater than the step length of the middle step and the bottom step;
   two step rods (64), each step rod pivotally coupled to the sides of each step adjacent to the rearward edges of the steps, a flexible strap (66) coupling a forward leg above the top step to one of the step rods adjacent to the top step, a latch pin (68) extending laterally from the middle step adjacent to one of the step rods, a latch (70) pivotably coupled to one of the forward legs between the top step and the middle step adapted to receive and retain the latch pin for abating movement between the forward legs and rearward legs, an inverted U-shaped handle (72) with parallel ends slidably received in the forward legs at the pivot ends, two handle pins (72), each handle pins located within a parallel end of the U-shaped handle, each handle pin spring urged outwardly from the parallel ends of the handle, a plurality of handle apertures (76) in the forward legs adjacent to the pivot ends on opposite sides of the pivot brackets, the pivot apertures adapted to selectively receive the pivot pins;

a tongue rod (80) between the rearward legs adjacent to the free ends, an imperforate tongue (82) pivotably secured to the tongue pin, two rotatable brackets (84) on each side of the tongue to insure secure positioning perpendicular to the rearward legs when in the dolly orientation with the forward legs and the rearward legs adjacent to each other, and with the steps in a common plane, each of the steps forming a step length and the space between adjacent steps forming a space length, each space length being between 2 percent and 4 percent of the step length; and two laterally spaced forward wheels (88) secured to and extending forwardly from the forward legs adjacent to the pivot ends, two laterally spaced rearward wheels (90) secured to and extending forwardly from the forward legs adjacent to the free ends, each wheel having a diameter between 10 percent and 15 percent of the rearward leg length; and an outrigger assembly (202), the outrigger assembly including a supplemental axle (204), the supplemental axle extending through the forward legs adjacent to the free ends, the supplemental axle having axle ends exterior of the forward legs, two rigid blocks (206), each block being in a generally rectilinear configuration and pivotally secured to the supplemental axle adjacent to one of the axle ends, each rigid block being rotatable about the supplemental axle, the rigid blocks adapted to contact a support surface to provide stability to the outrigger assembly and the system.

\* \* \* \* \*